excerpt

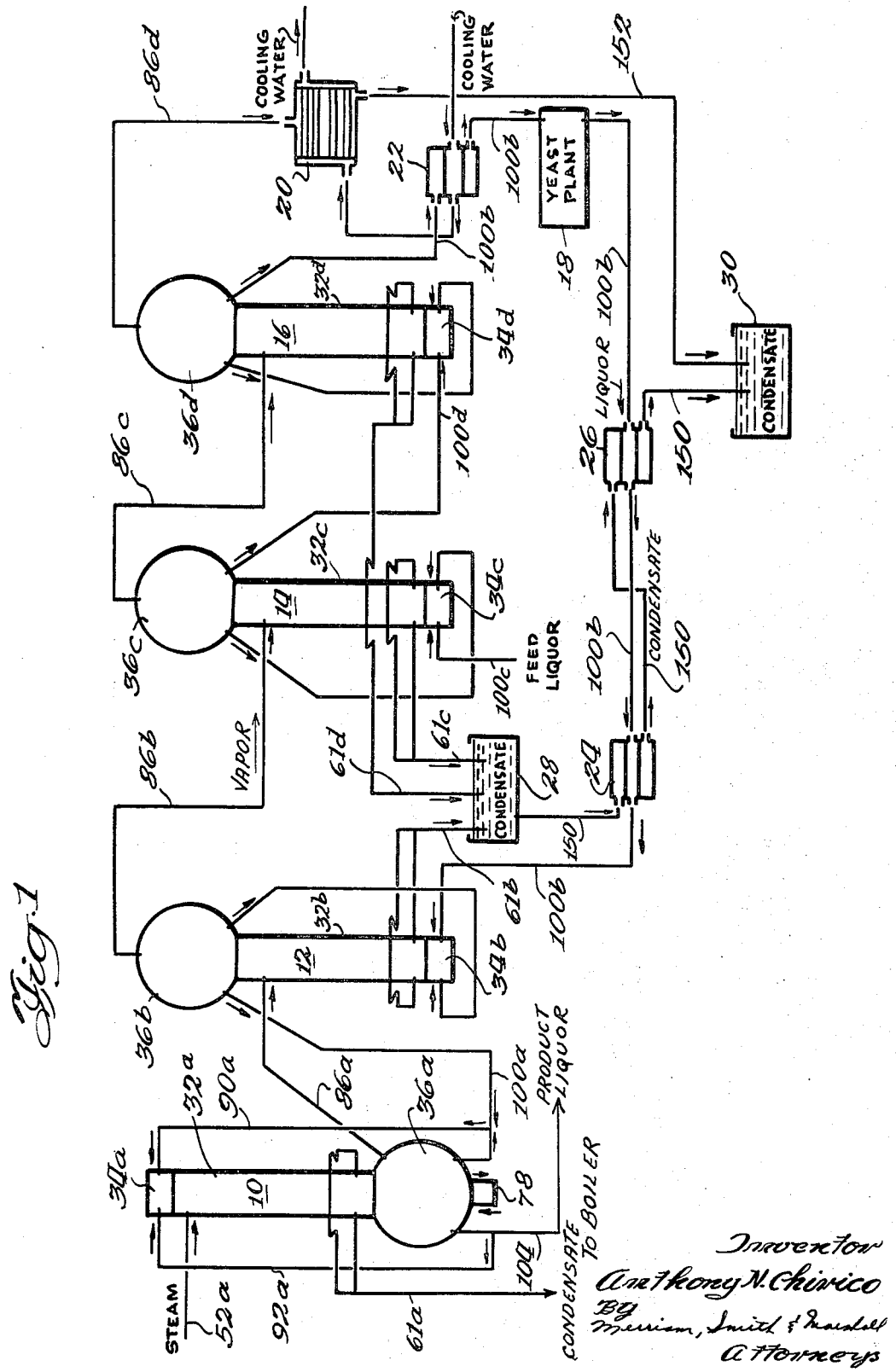

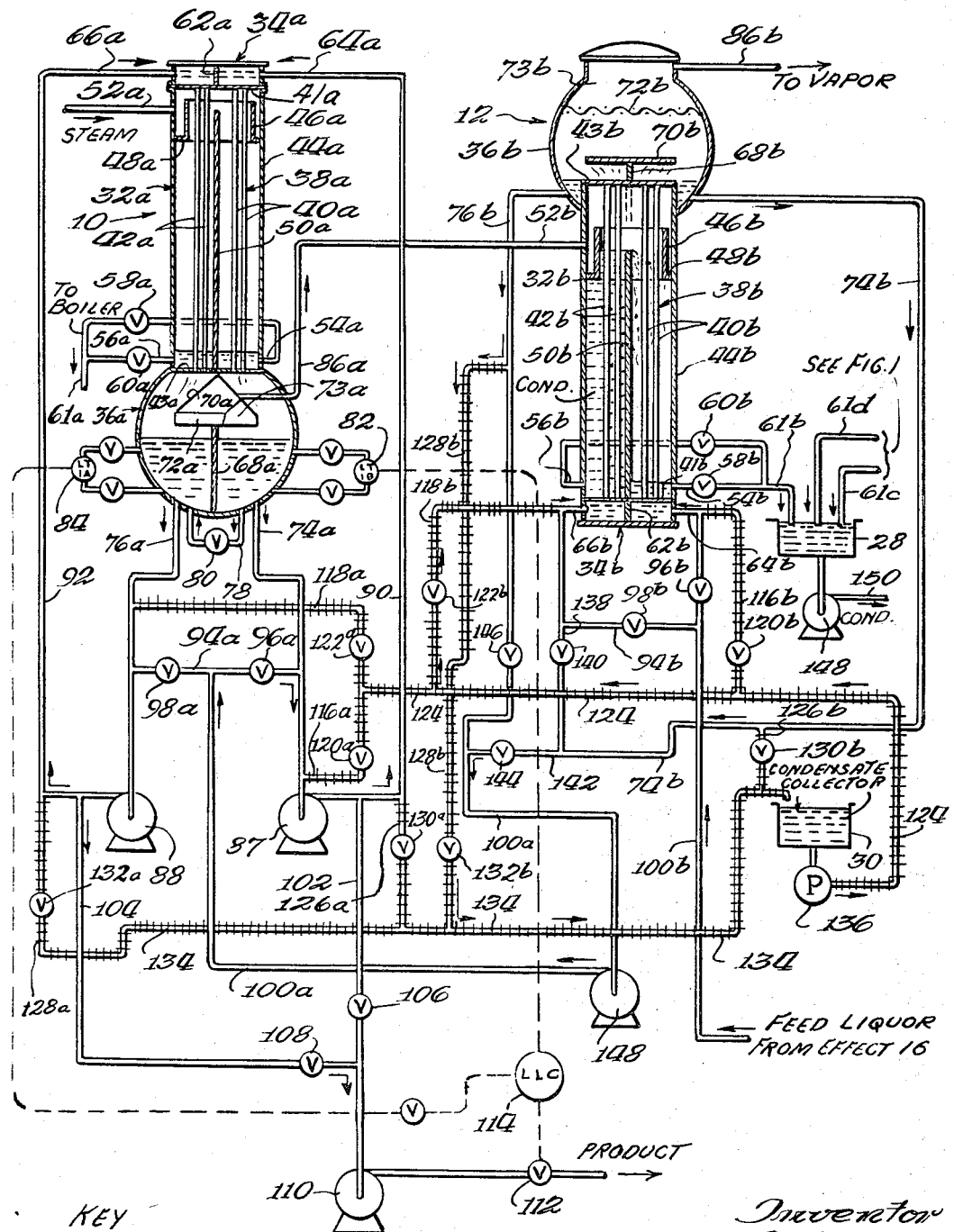

United States Patent Office 3,417,804
Patented Dec. 24, 1968

3,417,804
METHOD AND APPARATUS FOR SIMULTANEOUSLY WASHING AND WORKING AN EVAPORATOR EFFECT
Anthony N. Chirico, Naperville, Ill., assignor to Chicago Bridge and Iron Company, Oak Brook, Ill., a corporation of Illinois
Filed May 15, 1964, Ser. No. 367,665
9 Claims. (Cl. 159—20)

ABSTRACT OF THE DISCLOSURE

Separate segments of a multiple effect evaporator are selectively removed from operation for scale removal. The segment from which scale is to be removed is bypassed from feed circuit so that the evaporating side is open to condensate flow while the condensing side is exposed to vapor for heat exchange therewith and condensation and accumulation of the vapor condensate.

---

This invention relates to multiple effect evaporation of scale-forming liquors. More particularly, the invention relates to a method and apparatus for washing an evaporator effect to remove scale while evaporation is continued in the remainder of the evaporator.

Multiple effect evaporation of various liquors frequently is accompanied by the formation of scale on the liquor side of one or more evaporator effects. The scale reduces the heat transfer coefficient and consequently the capacity of the evaporator, making it necessary to remove the scale periodically. The problem of scaling is especially acute when the scale deposits are insoluble in water. For example, severe scaling problems are encountered in the evaporation of waste liquor from the manufacture of sulfite pulp and in the evaporation of saline liquors such as seawater brines. The problems are accentuated when the evaporator is shut down for cleaning and the scale is dehydrated, causing the scale to become hard and more resistant to removal.

Various methods have been employed in the past to remove scale. In many cases, the entire evaporator is shut down, with consequent loss of production. The scale is removed by boiling out the evaporator with water, alkali and/or acid, or by drilling out the evaporator tubes with a scale-removing tool. Even when operating for optimum periods of time between shutdowns for scale removal, it is necessary to contend with an undesirable average amount of scale on the heat transfer surfaces. Other methods for removing scale have been employed, which do not require shutdown of the evaporator. These methods involve bypassing the liquor and the vapor around the evaporator effect being washed. Such methods impose additional requirements for relatively expensive vapor piping. The additional vapor piping results in increased air leakage into the system and increases the venting requirements. The methods also involve blanking off sections of the vapor piping, which retards operation and increases the labor requirements.

The present invention provides a new and improved method and apparatus for evaporating a scale-forming liquor which overcome prior problems and provide substantial advantages over the prior methods and apparatus. In the invention, vapor condensate resulting from evaporation and at a relatively low temperature is employed to wash a part or section of the liquor side of one or more evaporator effects to remove insoluble scale formed thereon while the remainder of the evaporator is on stream or in production. In the preferred embodiments of the invention, liquor is bypassed around the part of an evaporator effect to be washed while vapor is conducted to the vapor side of the effect. Vapor condensate is conducted to the liquor side of the effect part and maintained preferably at a maximum temperature of about 212° F. for removing scale therefrom. Vapor condensate is accumulated on the vapor side of the effect part for removing scale therefrom. In this manner, both sides of the effect part are washed to remove scale while evaporation continues in the remainder of the evaporator, including the remainder of the effect being washed. It is further preferred to employ as the low temperature vapor condensate for washing, condensate from the vapor sides of the evaporator effects which has been conducted in indirect heat exchange relation to liquor being supplied to an effect for preheating the liquor while reducing the temperature of the condensate.

The invention provides a novel evaporator body and a multiple effect evaporator incorporating a plurality of evaporator bodies which are adapted for performing the new method and provide a number of advantages. A sectional evaporator body is provided which includes a vertical tube-in-shell heater having a liquor side within the tubes and a vapor side between the shell and the tubes. A liquor box and a vapor body are mounted on the heater in communication with the liquor side of the heater. The liquor box, vapor body, and heater liquor side together constitute the liquor side of the evaporator body, while the heater vapor side constitutes the vapor side of the evaporator body. Partition means divide the liquor box and the vapor body into sections communicating separately with different heater tubes, and separate liquor supply and liquor discharge conduits are provided for the respective sections for operating respective parts or sections of the evaporator body separately and independently. Partition means divide the heater vapor side into corresponding sections respectively enclosing separately the different tubes from their lower ends to a level adjacent to their upper ends. Separate condensate drains are provided for the respective vapor side sections. The vapor side sections and their drains are adapted for selectively accumulating vapor condensate in any one of the vapor side sections up to the said level for thereby washing the exterior while wash liquor is passed through the interior of the tubes enclosed by the section. Preferably, the vapor side sections of the heater are in vapor communication with each other, and vapor condensate may overflow from one vapor side section to another.

In washing a section of an evaporator body, vapor condensate for washing or wash condensate is supplied to the liquor side of the section being washed, while liquor to be concentrated is supplied to the liquor side of the remaining section or sections. Vapor may be supplied to the vapor side of the evaporator body in the same manner as in fully on-stream operation. Vapor condensate is allowed to accumulate in the section of the heater being washed for washing the exterior of the tubes therein, while vapor condensate is removed from the remaining section or sections in the usual manner for conducting evaporation.

A multiple effect evaporator is provided which incorporates a plurality of the new sectional evaporator bodies. Preferably, a vapor condensate collection vessel is provided, and condensate transfer conduits interconnect the evaporator body condensate drains and the collection vessel for collecting vapor condensate in the latter. Wash supply conduits interconnect the collection vessel and the evaporator body liquor supply conduits for supplying vapor condensate from the vessel to the liquor sides of the bodies for washing the latter. It is further preferred to provide a heat exchanger connected to the condensate transfer conduits, and a liquor supply conduit interconnecting the heat exchanger and the liquor supply conduits of an evaporator body for preheating liquor supplied to the body by indirect heat exchange with vapor condensate while reducing the temperature of the condensate prior to use as a wash liquid.

Employing the method and apparatus of the invention, the evaporator may be operated uninterruptedly while part of an effect is washed continuously on both of the liquor and vapor sides. In cases where it is unnecessary to wash the evaporator continuously, the entire evaporator may be placed on stream when not being washed, with resulting increased capacity and economy. Scale accumulation is kept at a minimum, and the heat transfer coefficient is maintained near the maximum value. At the same time, the scale is prevented from becoming dehydrated.

The invention is especially advantageous for use in the evaporation of liquors that form insoluble scale and result in the formation of acidic vapors and vapor condensates. Thus, for example, spent ammonia base sulfite liquor forms an insoluble scale upon evaporation. The vapor condensate obtained in the evaporation process has a pH of about 1.5–2, and it has been found to be effective in removing the scale which is deposited from the liquor. Owing to the inverse solubility characteristics of the scale, the condensate is most effective at relatively low temperatures, preferably at a maximum temperature of about 212° F. The method and apparatus of the invention provide for scale removal at such low temperatures to achieve optimum results.

The invention does away with the need for bypassing vapor around the effect being washed. By minimizing the vapor piping, air leakage into the system and venting requirements are minimized. Vapor bypass piping is replaced by less expensive condensate piping. The operations of placing an effect on a washing cycle and transferring the washing cycle from one effect to another are easily and rapidly accomplished, and they may be performed and controlled automatically.

The foregoing and other improvements and advantages of the invention will be apparent on reference to the specification and to the attached drawings illustrating preferred embodiments of the invention, wherein like reference symbols are employed for like parts in each of the views, and wherein:

FIGURE 1 is a diagrammatic illustration of a quadruple effect evaporator according to the invention in fully on-steam operation; and FIG. 2 is an enlarged detailed diagrammatic partial view of the evaporator, illustrating the sectional evaporator bodies of the first two effects in vertical axial section and the apparatus connected thereto, and illustrating the first effect body as it appears in fully on-stream operation and the second effect body as it appears when one section thereof is on stream and the remaining section is being washed.

Referring to the drawings, FIG. 1 illustrates a quadruple effect evaporator which includes first through fourth effect evaporator bodies 10, 12, 14 and 16, respectively. The evaporator is illustrated as it is employed for concentrating spent ammonia base sulfite liquor, in conjunction with a yeast plant 18 in which a portion of the solids content of the liquor is removed. The evaporator also includes a surface condenser 20 in the vapor transfer line from the fourth effect body 16. A heat exchanger 22 is connected in the liquor transfer line from the fourth effect body, between the body and the yeast plant. Heat exchangers 24 and 26 are connected in series in the liquor transfer line from the fourth effect evaporator body, between the yeast plant and the second effect evaporator body 12. A vapor condensate receiver 28 is associated with the second, third and fourth effect evaporator body heaters, and the receiver is connected to the latter heat exchangers 24 and 26 for supplying condensate thereto. A vapor condensate collection vessel 30 is arranged to collect condensate discharged from the heat exchangers and from the surface condenser 20.

Steam from a steam boiler (not shown) is supplied as a condensable vapor heating medium to the first effect evaporator body 10, and the vapor produced in each evaporator body is conducted to the successive effect body to serve as the condensable vapor heating medium therein. Vapor produced in the fourth effect body 16 is condensed in the surface condenser 20. Vapor condensate is conducted from the condenser to the collection vessel 30. Steam condensate from the first effect body 10 is returned to the boiler, preferably after recovering a portion of its heat content in a suitable manner, not illustrated. Vapor condensate from the remaining evaporator bodies 12, 14 and 16 is conducted to the receiver 28. Vapor condensate is conducted from the receiver to the heat exchangers 24 and 26 successively, and then to the collection vessel 30.

Feed liquor is supplied to the third effect body 14, and it flows in forward feed from the third effect body to the fourth effect body 16. Partly concentrated liquor from the fourth effect body is conducted to the heat exchanger 22 and then to the yeast plant 18. The liquor is conducted from the yeast plant to the heat exchangers 26 and 24 successively, and then to the second effect body 12. The liquor flows in backward feed from the second effect body to the first effect body 10. The concentrated liquor from the first effect body is removed from the evaporator as product. The illustrative method and apparatus thus provide mixed flow evaporation of the liquor. The invention also is applicable to concurrent flow evaporation, wherein the liquor flows in forward feed from the first effect body to the fourth effect body, and to counterflow evaporation, wherein the liquor flows in backward feed from the fourth effect body to the first effect body.

Each of the evaporator bodies 10, 12, 14 and 16 is divided into two sections or parts, and two stage evaporation is conducted therein. One or more of the evaporator bodies may be divided into a greater number of sections, and evaporation may take place in one or more stages. The first effect body 10 is a long tube vertical falling film evaporator body. The second, third and fourth effect bodies 12, 14 and 16 are long tube vertical climbing film bodies. Natural circulation is employed in each of the evaporator bodies, and the liquor makes two passes through the tubes in fully on-stream operation. The invention also is applicable to operation in forced circulation.

Each of the evaporator bodies includes a vertically arranged tube-in-shell or tubular heater, designated 32a–d for the respective first through fourth effect bodies 10, 12, 14 and 16. Each evaporator body includes a hollow cylindrical liquor box, respectively designated 34a–d, and a hollow generally spherical vapor body or disengaging vessel, respectively designated 35a–d. The liquor box 34a for the first effect evaporator body surmounts the heater, and the liquor boxes 34b–d of the remaining evaporator bodies are joined to the lower ends of their heaters. The vapor body 36a of the first effect evaporator is joined to the lower end of its heater. The vapor bodies 36b–d of the remaining evaporator bodies surmount their heaters, and the heaters extend into the bottoms of the vapor bodies.

Each of the evaporator bodies is partitioned into two sections, to provide for separate evaporation in each of the sections and two-stage evaporation in the evaporator body, and also to provide for washing each section separately while evaporation is conducted in the remaining section. Both types of evaporator bodies, as represented by the first effect body 10 and the second through fourth effect bodies 12, 14 and 16, are partitioned in essentially the same manner. FIG. 2 illustrates the construction of the first and second effect evaporator bodies 10 and 12 and the conduits and equipment connected thereto. The construction of the second effect evaporator body and its associated apparatus are illustrative of the body construction and apparatus in the third and fourth effects. Arrows are employed in FIG. 2 to indicate the directions of flow when operating in the illustrative manner.

The heater 32a of the first effect evaporator body contains an inner tube bundle 38a including a plurality of first section tubes 40a and a plurality of second section tubes 42a mounted at their opposite ends in circular tube sheets 41a and 43a. The tube bundle is enclosed by a circular tubular shell 44a. A circular tubular baffle surrounds the tube bundle adjacent to and spaced below its upper end. The baffle includes an upwardly extending tube 46a spaced inwardly from the heater shell 44a, and an annular rim or spacer 48a extending outwardly from the tube to the shell. A central vertical partition or divider panel 50a in the heater extends from the lower ends of the tubes up to a level adjacent to and spaced below their upper ends and also a short distance below the upper end of the baffle tube 46a. The heater partition extends diametrically for the width of the baffle tube and for the width of the shell therebelow, to divide the vapor side of the heater into two separate sections of equal size on opposite sides of the partition. The vapor side sections respectively enclose the first and second section tubes 40a and 42a up to the top of the partition, at which level all of the tubes are in vapor communication with each other.

A vapor supply conduit 52a is connected to the upper end of the heater shell 44a in communication with the interior of the heater opposite to the baffle tube 46a. Two condensate drains or drain conduits 54a and 56a having valves 58a and 60a are connected to the lower end of the heater shell in communication with the interior thereof on opposite sides of the partition 50a. The drains are connected to a transfer conduit 61a that leads to the steam boiler.

When the first effect evaporator body 10 is fully on stream, steam is supplied to the heater 32a through the vapor supply conduit 52a. The steam flows around the baffle tube 46a and over the first and second section tubes 40a and 42a, on both sides of the partition 50a. As the steam condenses during evaporation of liquor within the tubes, condensate forms and collects at the bottom of the tubes, on both sides of the partition. The condensate is drained from the respective sections of the heater through the drains 54a and 56a and their valves 58a and 60a, and it is removed through the transfer conduit 61a. When either of the drain valves is closed, condensate accumulates in the corresponding section up to the top of the partition 50a. When the condensate reaches the top of the partition, it overflows into the remaining section and is discharged through the remaining drain. This condition is illustrated for the second effect heater 32b, where condensate is shown as having accumulated in the second section containing the tubes 42b.

The first effect liquor box 34a is provided with a central vertical partition or divider panel 62a, which extends diametrically for the width of the box from the bottom to the top of the box. The partition divides the liquor box into two separate sections of equal size on opposite sides thereof. The respective sections communicate separately with the interior of the first and second section tubes 40a and 42a for supplying liquor thereto. Two liquor supply conduits 64a and 66a are connected to the liquor box 34a on opposite sides of its partition 62a for supplying liquor to the respective liquor box sections. Liquor to be concentrated may be supplied to either or both of the liquor box sections. The liquor falls through the tubes 40a and/or 42a, as the case may be, and the liquor is heated in the tubes to produce a vapor-liquid mixture.

A central vertical transverse partition or divider panel 68a extends diametrically across the bottom of the first effect vapor body 36a for the width thereof. The partition divides the bottom of the vapor body into two separate sections of equal size on opposite sides thereof. An upwardly convergent angular baffle 70a is centrally mounted over the vapor body partition with its apex abutting on the heater 32a and extending diametrically thereacross beneath the heater partition 50a. The baffle extends transversely between opposite sides of the vapor body for the width of the body and is spaced inwardly from the adjacent sides. The baffle divides the upper zone of the vapor body into two separate sections of equal size respectively communicating separately with the interior of the first and second section tubes 40a and 42a and with the bottom sections of the vapor body. In this manner, the respective bottom sections communicate separately with the interior of the first and second section tubes 40a and 42a to receive liquor discharged therefrom. A horizontal mesh pad separator 72a extends across the bottom of the baffle on top of the vapor body partition 68a, to form a vapor collecting chamber 73a beneath the baffle.

Two liquor discharge conduits 74a and 76a are connected to the bottom of the vapor body 36a on opposite sides of its partition 68a. A liquor transfer conduit 78 is connected to the bottom of the vapor body on both sides of the partition, and a valve 80 is provided in the conduit. Liquid level transmitters 82 and 84 are connected to the vapor body on opposite sides of the partition. A vapor transfer conduit 86a is connected to the top of the vapor body in communication with the vapor collecting chamber 73a.

The heated vapor-liquid mixture issuing from the tubes 40a and 42a descends on opposite sides of the vapor body baffle 70a and on opposite sides of the vapor body partition 68a. Vapor disengages from concentrated liquor. The vapor disengaged on both sides of the partition 68a flows upwardly through the separator 72a and into the collecting chamber 73a. The vapor then leaves the vapor body through the vapor transfer conduit 86a. Concentrated liquor collects separately on both sides of the partition, and the liquid level is equalized through the transfer conduit 78. Liquor is discharged on opposite sides of the partition through the liquor discharge conduits 74a and 76a. The level transmitters 82 and 84 regulate the amount of liquor withdrawn from the evaporator.

Liquor circulation pumps 87 and 88 are connected to the respective liquor discharge conduits 74a and 76a of the first effect evaporator body 10. Liquor circulating conduits 90 and 92 are connected to the respective pumps and to the respective liquor supply conduits 64a and 66a. A flow directing conduit 94a is provided with valves 96a and 98a, and it interconnects the liquor discharge conduits 74a and 76a. A liquor transfer conduit 100a is connected to the flow directing conduit between its valves, for supplying liquor to be concentrated to the evaporator body.

In the illustrative manner of operation, the liquor circulation pump 87 pumps the liquor to be concentrated to the liquor supply conduit 64a for one section of the liquor box, together with liquor being recycled from the corresponding bottom section of the vapor body 36a and which is withdrawn through the discharge conduit 74a. Liquor also flows from the latter section through the vapor body transfer conduit 78 to the bottom section on the opposite side of the partition 68a. Liquor is withdrawn from the latter section through the discharge conduit 76a, and is pumped by the remaining circulation pump 88 to the liquor supply conduit 66a for the remaining section of the liquor box. Alternatively, the liquor flow through the sections of the evaporator may be reversed, by appropriate adjustment of the several valves.

Product liquor transfer conduits 102 and 104 having valves 106 and 108 are connected to the respective circulating conduits 90 and 92 and to the intake side of a liquor withdrawal pump 110. A flow control valve 112 is connected to the discharge side of the pump. The valve is regulated by a liquor level controller 114 operatively connected to the liquor level transmitters 82 and 84 on the vapor body 36a. In the illustrative manner of operation, concentrated product liquor is withdrawn through one product transfer conduit 104. When operating with liquor flow through the evaporator reversed, product liquor is withdrawn through the remaining product transfer conduit 102.

Wash supply conduits 116a and 118a having valves 120a and 122a are connected to the respective liquor discharge conduits 74a and 76a of the first effect evaporator body 10. A wash supply manifold 124 is connected to the wash supply conduits and to the condensate collection vessel 30. Wash discharge conduits 126a and 128a having valves 130a and 132a are connected to the respective liquor circulating conduits 90 and 92, and to a wash discharge manifold 134. Vapor condensate from the condensate collection vessel may be supplied to the evaporator body by means of a pump 136 connected to the wash supply manifold. The condensate may be directed to either section of the evaporator body for washing the section, and wash liquor may be discharged therefrom into the discharge manifold. The discharge manifold is arranged to return the wash liquor to the condensate collection vessel. Alternatively, the wash liquor may be conveyed elsewhere or discarded. Either section of the evaporator body may be washed separately while the remaining section is employed to conduct evaporation. In the illustrative manner of operation, the first effect evaporator body 10 is fully on stream and not being washed. The manner in which this body is washed will be described subsequently.

The second effect evaporator body 12 is constructed similarly to the first effect evaporator body 10, with the changes in liquor box and vapor body locations previously described. Various components of the second effect evaporator body and its associated apparatus correspond functionally to those of the first effect evaporator body, and accordingly, the former are identified in FIG. 2 by the same numerals as the latter with the addition of the letter b. Certain parts are identified in the same manner in FIG. 1, and the corresponding parts of the third and fourth effect evaporator bodies 14 and 16 and their associated apparatus bear the same numerals with the respective addition of the letters c and d.

The heater 32b of the second effect evaporator body 12 and the connections thereto are substantially the same as those of the first effect evaporator body 10. The heater contains an inner tube bundle 38b including first and second section tubes 40b and 42b. The tube bundle is enclosed by a tubular shell 44b. A circular tubular baffle including a tube 46b and a rim 48b surrounds the tube bundle within the shell adjacent to and spaced below the upper end of the tubes. A central vertical partition 50b divides the vapor side of the heater into two equal sections respectively enclosing the first and second section tubes 40b and 42b from their lower ends up to a level adjacent to and spaced below the upper ends of the tubes and the baffle. A vapor supply conduit 52b is connected to the upper end of the heater shell opposite to the baffle tube 46b. Two condensate drains 54b and 56b having valves 58b and 60b are connected to the lower end of the heater shell on opposite sides of the heater partition. The drains are connected to a condensate transfer conduit 61b that is arranged to discharge into the condensate receiver 28.

The second effect liquor box 34b at the lower end of the heater is provided with a central vertical partition 62b. The partition divides the liquor box into two separate sections of equal size on opposite sides thereof, which communicate separately with the respective first and second section tubes 40b and 42b. Two liquor supply conduits 64b and 65b are connected to the liquor box on opposite sides of its partition. Liquor to be concentrated may be supplied through the supply conduits to either or both of the liquor box sections. The liquor ascends through the tubes 40b and 42b, as the case may be, and the liquor is heated in the tubes to produce a vapor-liquid mixture.

The second effect heater 32b extends into the bottom of the vapor body 36b thereon. A central vertical transverse partition 68b extends across the bottom of the vapor body between opposite sides thereof for the width of the body. The partition also extends between the corresponding sides of the heater shell and the vapor body sides, to bridge the spaces therebetween and divide the bottom of the vapor body into two separate sections of equal size on opposite sides of the partition. The respective sections communicate separately with the interior of the first and second section tubes 40a and 42a to receive the vapor-liquid mixture discharged therefrom. A flat horizontal baffle 70b is mounted on the partition. The baffle extends transversely between the opposite sides of the vapor body for the width thereof and is spaced from the adjacent sides. The baffle directs the mixture from the tubes into the respective vapor body bottom sections on opposite sides of the partition. A horizontal mesh pad separator 72b extends completely across the vapor body in spaced relation above the baffle. The separator is spaced below the top of the vapor body, to form a vapor collecting chamber 73b above the separator. Two liquor discharge conduits 74b and 76b are connected to the bottom of the vapor body on opposite sides of its partition. A vapor transfer conduit 86b is connected to the top of the vapor body in communication with the vapor collecting chamber 73b.

The heated vapor-liquid mixture issuing from the tubes 40b and 42b is caused by the partition 68b and the baffle 70b to be discharged on opposite sides of the partition. Vapor disengages from concentrated liquor and flows upwardly from both sides of the partition through the separator 72b and into the collecting chamber 73b, from whence it leaves the vapor body through the vapor transfer conduit 86b. Concentrated liquor collects separately on both sides of the partition, and the liquor from the respective sides is discharged through the liquor discharge conduits 74b and 76b.

A flow directing conduit 94b having valves 96b and 98b is connected across the liquor supply conduits 64b and 66b of the second effect evaporator body 12. A liquor transfer conduit 100b is connected to the flow directing conduit between the valves thereof for supplying liquor to be concentrated to the evaporator body. One liquor discharge conduit 74b communicates with the liquor supply conduit 66b for the remaining section of the evaporator body by a second stage transfer conduit 138 having a valve 140. The liquor discharge conduit 74b also communicates with the liquor transfer conduit 100a to the first effect, by means of a bypass conduit 142 having a valve 144. The remaining liquor discharge conduit 76b is provided with a valve 146 and also is connected to the liquor transfer conduit 100a. A liquor transfer pump 148 is connected to the liquor transfer conduit for conducting liquor from the second effect evaporator body 12 to the first effect evaporator body 10.

For the purpose of conducting two-stage evaporation in the second effect evaporator body, liquor to be concentrated is supplied to one section of the body through the liquor transfer conduit 100b and the liquor supply conduit 64b. The liquor ascends through the first section tubes 40b, and it is heated therein and discharged into the corresponding section of the vapor body 36b. Concentrated liquor is discharged through the discharge conduit 74b, and it is then conducted to the remaining section through the second stage conduit 138 and the supply conduit 66b. The liquor ascends in the second section tubes 42b, and it is heated therein and discharged into the remaining section of the vapor body 36b. The concentrated liquor is discharged through the discharge conduit 76b and conducted to the first effect evaporator body 10 through the liquor transfer line 100a. The vapor which disengages in the vapor body 36b collects in the vapor collecting chamber 73b and leaves the vapor body through the vapor transfer conduit 86b. The conduits illustrated for the second effect are arranged for flow of liquor through the evaporator body in one direction, as described. Alternatively, additional conduits may be provided for reversing the flow through the evaporator body, if desired.

Wash supply conduits 116b and 118b having valves 120b and 122b are connected to the wash supply manifold 124 and to the respective liquor supply conduits 64b and 66b. Wash liquor discharge conduits 126b and 128b having valves 130b and 132b are connected to the liquor discharge conduits 74b and 76b and to the wash discharge manifold 134. Vapor condensate from the condensate collection vessel 30 may be supplied to either section of the evaporator while the remaining section is employed for liquor concentration, and the wash liquor is returned from the section being washed to the collection vessel.

When operating in the manner illustrated in FIG. 2, vapor condensate from the condensate collection vessel 30 is supplied to one section of the second effect evaporator body 12 through the wash supply conduit 118b and the liquor supply conduit 66b connected to one section of the liquor box 34b. The condensate ascends in the second section tubes 42b to wash the interior of the tubes, and it is discharged in the corresponding section of the vapor body 36b. The resulting wash liquor is discharged from the vapor body through the corresponding liquor discharge conduit 76b. The wash liquor is returned to the collection vessel through the wash discharge conduit 128b and the wash discharge manifold 134. At the same time, liquor from the fourth effect evaporator body 16 and the yeast plant 18 (FIG. 1) is conducted through the liquor transfer conduit 100b and the liquor supply conduit 64b to the remaining section of the liquor box 34b. The liquor ascends in the first section tubes 40b, where it is heated. The vapor-liquid mixture is discharged into the corresponding section of the vapor body 36b. Concentrated liquor is removed through the discharge conduit 74b. The liquor is conducted directly to the first effect evaporator body 10 through the bypass conduit 142 and the liquor transfer conduit 100a, thereby bypassing the liquor around the section of the second effect evaporator body which is being washed. Vapor which is separated from the concentrated liquor in the vapor body 36b is conducted through the vapor transfer conduit 86b to the vapor side of the third effect heater 32c.

Vapor separated in the first effect vapor body 36a is conducted to the vapor side of the second effect heater 32b, through the vapor transfer conduit 86a and the vapor supply conduit 52b. The vapor flows around the first and second section tubes 40b and 42b, and the vapor condenses on the tubes. The condensate drain valve 58b for the section in which evaporation takes place is open, and the drain valve 60b for the section being washed is closed. The vapor condensate in the former section is removed through its drain valve 58b, and the condensate is conducted to the receiver 28 through the transfer conduit 61b. Condensate accumulates in the section being washed, and it may reach the upper level of the heater partition 50b and overflow the partition, as illustrated. The overflow is removed through the drain valve 58b together with the condensate from the section in which evaporation takes place. The second section tubes 42b are immersed in the accumulated vapor condensate up to a level adjacent to their upper ends, so that the external surfaces of the tubes are given a soaking wash by the condensate. The temperature of the wash condensate is maintained below 212° F. within the tubes, so that the condensate remains in the liquid state and washing takes place at favorable low temperatures.

The remaining section of the second effect evaporator body 12 may be washed in like manner. For this purpose, condensate for washing is conducted to the remaining section of the liquor box through the wash supply conduit 116b and the liquor supply conduit 64b connected thereto. Wash liquor is discharged through the liquor discharge conduit 74b, and it is returned to the collection vessel 30 through the wash discharge conduit 126b and the discharge manifold 134. Liquor to be concentrated is supplied to the liquor box through the transfer conduit 100b and the liquor supply conduit 66b. The concentrated liquor is discharged through the liquor discharge conduit 76b, and it is conducted to the first effect evaporator body 10 through the liquor transfer conduit 100a. Vapor is conducted from the vapor body 36b to the third effect heater 32c, in the same manner as when washing the other section. The condensate drain valve 58b is closed, and the drain valve 60b is open. Condensate formed around the second section tubes 42b is removed through the latter drain valve and conducted to the receiver 28 through the transfer conduit 61b. Vapor accumulates around the first section tubes 40b and may overflow the heater partition 50b. The internal surfaces of the first section tubes 40b are washed by the condensate supplied thereto, and the external surfaces of the tubes are washed by the vapor condensate which accumulates therearound.

When neither section is being washed, both sections are placed on stream for two-stage evaporation in the manner previously described. At this time, both of the condensate drain valves 58b and 60b are open for discharging condensate to the receiver 28. The wash supply conduits 116b and 118b, and the wash liquor discharge conduits 126b and 128b are closed by their respective valves 120b, 122b, 130b and 132b.

The third and fourth effect evaporator bodies 14 and 16 and the apparatus connected thereto are constructed and arranged in the same or substantially the same manner as are the second effect evaporator body 12 and its associated apparatus. The sections of the third and fourth effect evaporator bodies are washed in the same manner. The first effect evaporator body 10 is washed in the same manner as the second effect evaporator body, except for a difference in manipulative steps occasioned by the different type of evaporator body.

In washing either section of the first effect evaporator body 10, the valve 80 in the vapor body transfer conduit 78 is closed to isolate the bottom sections of the vapor body 36a from each other. One section of the evaporator body is washed by supplying vapor condensate from the collection vessel 30 through the wash supply conduit 118a and the circulating conduit 92 to the liquor supply conduit 66a connected to one section of the liquor box. Wash liquor is removed from the vapor body through the liquor discharge conduit 76a and the wash discharge conduit 128a. Liquor from the second effect to be concentrated in the first effect is conducted through the liquor transfer conduit 100a and the circulating conduit 90 to the liquor supply conduit 64a connected to the remaining section of the liquor box 34a. Concentrated liquor is removed from the vapor body through the corresponding liquor discharge conduit 74a and the product liquor transfer conduit 102. Vapor is conducted from the vapor body through the vapor transfer conduit 86a to the second effect heater 32b The condensate drain valve 58a is open for discharging vapor condensate condensed on the first section tubes 40a through the transfer conduit 61a. The condensate drain valve 60a is closed for accumulating vapor condensate around the second section tubes 42a.

The remaining section of the first effect evaporator body 10 is washed in like manner. Condensate for washing is supplied through the wash supply conduit 116a and the circulating conduit 90. Wash liquor is discharged through the liquor discharge conduit 74a and the wash discharge conduit 126a. Liquor to be concentrated is supplied through the circulating conduit 92, and concentrated liquor is removed through the liquor discharge conduit 76a and the product liquor transfer conduit 104. Vapor continues to be removed from the vapor body through the vapor transfer conduit 86a. The condensate drain valve 58a is closed for accumulating vapor condensate around the first section tubes 40a, and the drain valve 60a is open to the condensate transfer conduit 61a.

When the evaporator is fully on stream as illustrated in FIG. 1, steam is supplied to the first effect evaporator body 10, and vapor is transferred through the vapor transfer conduits 86a, 86b and 86c, from the first, second and third effect bodies 10, 12 and 14 to the second, third and fourth effect bodies 12, 14, and 16, respectively. Vapor is transferred through the vapor transfer conduit 86d from the fourth effect body 16 to the surface condenser 20. As an illustration of the conditions of operation, steam may be supplied to the first effect evaporator body at a pressure of about 40 p.s.i.g. and a temperature of about 287° F. when concentrating spent ammonia base sulfite liquor. The vapor transferred to the fourth effect evaporator body may be at a temperature of about 170° F.

The steam condensate from the first effect evaporator body 10 is returned to the boiler through the condensate transfer conduit 61a. The vapor condensate from the remaining three evaporator bodies 12, 14 and 16 is conducted through the respective condensate transfer conduits 61b, 61c and 61d to the condensate receiver 28. The temperature of the condensate in the receiver may be about 190° F. The receiver is connected to the heat exchangers 24 and 26 by a pump 148 (FIG. 2) and a transfer conduit 150. The condensate is conducted to the heat exchangers 24 and 26 successively for preheating the liquor supplied to the second effect evaporator body 12. The condensate is discharged from the heat exchangers into the condensate collection vessel 30. The vapor from the fourth effect evaporator body 16 is condensed in the condenser 20 by cooling water circulated therethrough. The resulting vapor condensate is conducted through a condensate transfer conduit 152 to the collection vessel 30. The temperature of the condensate in the collection vessel may be about 120–130° F.

Spent ammonia base sulfite liquor having a total solids concentration of about 12.5% by weight and at a temperature on the order of 175° F. may constitute the feed liquor to the evaporator. The feed liquor is supplied through a liquor transfer conduit 100c to the third effect evaporator body 14 and subjected to two-stage evaporation therein. The concentrated liquor is conducted through a liquor transfer conduit 100d to the fourth effect evaporator body 16. Two-stage evaporation is conducted in the fourth effect body. Concentrated liquor which may be at a temperature of about 135° F. and have a total solids concentration of about 21.5% is conducted through the liquor transfer conduit 100b to the heat exchanger 22. Cooling water is supplied to the heat exchanger 22 and then to the condenser 20. The liquor may leave the heat exchanger at a temperature of about 95° F., and it is conducted to the yeast plant 18. The liquor may leave the yeast plant at a temperature of about 95° F. and a total solids content of 19.1%. The liquor is conducted in countercurrent flow through the heat exchangers 26 and 24 successively. The liquor may leave the latter heat exchanger at a temperature of 180° F. and a total solids content of 19.1%, and it is supplied through the transfer conduit 100b to the second effect evaporator body 12. The liquor is subjected to two-stage evaporation in the second effect body, and is then conducted to the first effect body 10 through the transfer conduit 100a. The liquor is subjected to two-stage evaporation in the first effect body 10, and it is withdrawn from the evaporator through the product liquor transfer conduit 104. The concentrated product liquor obtained in this manner may have a temperature of about 220° F. and a total solids concentration of about 60%, as is desirable for charging to a furnace for disposing of the waste material in a conventional manner.

Evaporation at such temperatures and concentrations causes large quantities of insoluble scale to deposit on the liquor sides of the evaporator bodies, and scale also is deposited on the vapor sides of the bodies. Consequently, it is necessary that the effects be washed frequently. For example, daily washing of each effect is required when evaporation takes place at a rate on the order of 171,000 pounds per hour.

The condensate in the collection vessel 30 is at a favorable low temperature for washing the internal surfaces of the heater tubes. It may be conducted to any one of the evaporator body sections for this purpose, as illustrated in FIG. 2 and described above. The remainder of the evaporator may be maintained on stream while a section undergoes a washing cycle, with the vapor being conducted between effects in the same manner and the liquor being conducted between effects in substantially the same manner as when not washing, except for bypassing the section being washed. The washing cycle may be transferred from one evaporator body section to the other and from one evaporator body to another evaporator body easily and rapidly. Similarly, the entire evaporator may be placed on stream readily when none of the effects are being washed. The evaporator reaches equilibrium rapidly following each change of conditions occasioned by the washing cycles. In this manner, evaporation may be conducted very efficiently at a high rate of continuous production.

Employing the preferred method and apparatus, the requirements for plant capacity and equipment are minimized. It is only necessary to provide the partitions which subdivide the evaporator bodies into sections, and a quantity of wash condensate piping and liquor bypass piping which compares favorably with the prior requirements for washing. The liquor box and vapor body partitions perform dual functions, serving both for washing individual sections of the evaporator bodies and for conducting two-stage evaporation therein. The vapor piping is maintained at the minimum requirements for evaporation.

Washing of the vapor side of the first effect body 10 is only infrequently required because little scale forms on the outside of the tubes since steam is fed to the vapor side for heating. Thus, when washing the liquor side of the tubes it is often sufficient to utilize the steam condensate to blank off the heat transfer so that during washing, the wash liquor will not boil. The condensate need not soak the external surfaces of the tubes but rather need just blank off the surface so that steam cannot condense on the tubes. When the effect body 10 is an effect other than a first effect, vapor condensate would be the heating media so that then the external surfaces of the tubes become fouled more quickly and in such case the condensate would be used to remove the scale by soaking the external surfaces of the tubes with it.

The illustrative apparatus is preferred for the reasons given. However, it may at times be advantageous to employ evaporator bodies in parallel in place of the bodies subdivided into sections, such as where large capacity evaporators are necessary. In this case, two or more bodies in parallel may constitute one effect with vapor from the preceding effect supplied to the bodies in parallel. Liquor to be concentrated may be supplied to the evaporator bodies in series, so that multistage evaporation takes place in the effect. The liquor may be bypassed around any one of the bodies when it is desired to wash the body, and vapor condensate may be supplied to the body for washing it in the same manner as described above for washing one section of a sectional evaporator body.

Furthermore, while the specification and the drawings are primarily directed to apparatus and methods in which a tube-in-shell heater is or can be employed, it is obvious that the novel apparatus and method features of the invention are equally applicable to heaters of the plate type made up from plates positioned vertically in spaced apart sandwiched arrangement to each other with exterior wall plates completing the main body of the unit, thereby forming consecutive vertical chambers which comprise the liquor and vapor sides of the heater body. A liquor box and vapor body can be mounted on the plate type heater similarly to the tube-in-shell heater.

While preferred embodiments of the invention have been illustrated and described, it will be apparent that the new method may be conducted in other evaporator body constructions and in other arrangements of evaporator bodies, and various changes and modifications in the method may be made within the spirit and scope of the invention. The apparatus also may be changed and modified within the spirit and scope of the invention. It is intended that such changes and modifications be included within the scope of the appended claims.

I claim:

1. In a method of evaporating a scale-forming liquor in a multiple effect evaporator wherein a vapor condensate is produced and collected outside the effects, the improvement which comprises bypassing liquor to be evaporated around part of a liquor side of an evaporator effect while conducting vapor to the vapor side thereof and maintaining the remainder of the evaporator on stream, supplying said collected vapor condensate to the bypassed liquor side of said part of said effect and maintaining the condensate at a maximum temperature of about 212° F. to remove scale formed on said part of the liquor side, and concurrently accumulating vapor condensate on the heating vapor side of said part of said effect to remove scale formed thereon.

2. A method as defined in claim 1 wherein vapor condensate from the heating vapor sides of the evaporator effects is conducted in indirect heat exchange relation to liquor being supplied to an effect for preheating the liquor while reducing the temperature of the condensate, and the vapor condensate thereafter is employed as said vapor condensate supplied to the liquor side of said part of said first-named effect.

3. A sectional evaporator body adapted for washing one section while conducting evaporation in another section thereof which comprises a vertical tube-in-shell heater having a liquor side internally of the tubes and a vapor side externally thereof, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different tubes in said heater, separate liquor supply conduits for respective liquor box sections, partition means dividing the bottom of said vapor body into sections respectively communicating separately with said different tubes for separately collecting liquor from respective liquor box sections, separate liquor discharge conduits for respective vapor body sections, partition means dividing said heater vapor side into sections respectively enclosing separately different tubes from their lower ends to a level adjacent to their upper ends, and separate condensate drains for respective vapor side sections, said vapor side sections and drains therefor being adapted for selectively accumulating vapor condensate in any one of the vapor side sections up to said level for thereby washing the exterior while wash liquor is passed through the interior of the tubes enclosed by the section.

4. A sectional evaporator body adapted for washing one section while conducting evaporation in another section thereof which comprises a vertical tube-in-shell heater having a liquor side internally of the tubes and a vapor side externally thereof, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different tubes in said heater, separate liquor supply conduits for respective liquor box sections, partition means dividing the bottom of said vapor body into sections respectively communicating separately with said different tubes for separately collecting liquor from respective liquor box sections, separate liquor discharge conduits for respective vapor body sections, parttition means dividing said heater vapor side into sections respectively enclosing separately said different tubes from their lower ends to a level adjacent to and spaced below their upper ends, whereby said vapor side sections are in vapor communication with each other and vapor condensate may overflow from one vapor side section to another, and separate condensate drains for respective vapor side sections, said vapor side sections and drains therefor being adapted for selectively accumulating vapor condensate in any one of the vapor side sections up to said level for thereby washing the exterior while wash liquor is passed through the interior of the tubes enclosed by the section.

5. A mutliple effect evaporator which comprises a plurality of sectional evaporator bodies each adapted for washing one section while conducting evaporation in another section thereof whereby an evaporator body section may be washed while the remainder of the evaporator is on stream, said evaporator bodies each comprising a vertical tube-in-shell heater having a liquor side internally of the tubes and a vapor side externally thereof, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different tubes in said heater, separate liquor supply conduits for respective liquor box sections, partition means dividing the bottom of said vapor body into sections respectively communicating separately with said different tubes for separately collecting liquor from respective liquor box sections, separate liquor discharge conduits for respective vapor body sections, partition means dividing said heater vapor side into sections respectively enclosing separately said different tubes from ther lower ends to a level adjacent to their upper ends, and separate condensate drains for respective vapor side sections, said vapor side sections and drains therefor being adapted for selectively accumulating vapor condensate in any one of the vapor side sections up to said level for thereby washing the exterior while wash liquor is passed through the interior of the tubes enclosed by the section; a vapor condensate collection vessel; condensate transfer conduits interconnecting said condensate drains and said collection vessel for collecting vapor condensate in the latter; and wash supply conduits interconnecting said collection vessel and said liquor supply conduits for supplying vapor condensate from the vessel to said liquor sides for washing the latter.

6. An evaporator as defined in claim 5 including a heat exchanger connected to said condensate transfer conduits, and a liquor supply conduit interconnecting said heat exchanger and said liquor supply conduits of an evaporator body for preheating liquor supplied to the body by indirect heat exchange with vapor condensate while reducing the temperature of the condensate.

7. A sectional evaporator body adapted for washing one section while conducting evaporation in another section thereof which comprises a vertical heater having a liquor side and a vapor side, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different sections of the liquor side of said heater, separate liquor supply conduits for respective liquor box sections, partition means dividing the bottom of said vapor body into sections respectively communicating separately with said different sections of the liquor side of the heater for separately collecting liquor from respective liquor box sections, separate liquor discharge conduits for respective vapor body sections, partition means dividing said heater vapor side into sections respectively enclosing separately said different sections of the liquor side from their lower ends to a level adjacent to their upper ends, and separate condensate drains for respective vapor side sections, said vapor side sections and drains therefor being adapted for selectively accumulating vapor condensate in any one of the vapor side sections up to said level for thereby washing the vapor side section while wash liquor is passed through the liquor side section enclosed thereby.

8. A sectional evaporator body adapted for washing one section while conducting evaporation in another section thereof which comprises a vertical heater having a liquor side and a vapor side, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different sections of the liquor side of said heater, separate liquor supply conduits for respective liquor box sections, partition means dividing the bottom of said vapor body into sections respectively communicating separately with said different sections of the liquor side of the heater for separately collecting liquor from respective liquor box sections, separate liquor discharge conduits for respective vapor body sections, partition means dividing said heater vapor side into sections respectively enclosing separately said different sections of the liquor side from their lower ends to a level adjacent to and spaced below their upper ends, whereby said vapor side sections are in vapor communication with each other and vapor condensate may overflow from one vapor side section to another, and separate condensate drains for respective vapor side sections, said vapor side sections and drains therefor being adapted for selectively accumulating vapor condensate in any one of the vapor side sections up to said level for thereby washing the vapor side section while wash liquor is passed through the liquor side section enclosed thereby.

9. A multiple effect evaporator which comprises a plurality of sectional evaporator bodies each adapted for washing one section while conducting evaporation in another section thereof whereby an evaporator body section may be washed while the remainder of the evaporator is on stream, said evaporator bodies each comprising a vertical heater having a liquor side and a vapor side, a liquor box mounted on said heater in communication with said liquor side for supplying feed liquor thereto, a vapor body mounted on said heater in communication with said liquor side for collecting concentrated liquor at the bottom and vapor at the top of the vapor body, partition means dividing said liquor box into sections respectively communicating separately with different sections of the liquor side of said heater, separate liquor supply conduits for respective liquor box sections, partition means dividing the bottom of said vapor body into sections respectively communicating separately with said different sections of the liquor side of the heater for separately collecting liquor from respective liquor box sections, separate liquor discharge conduits for respective vapor body sections, partition means dividing said heater vapor side into sections respectively enclosing separately said different sections of the liquor side from their lower ends to a level adjacent to their upper ends, and separate condensate drains for respective vapor side sections, said vapor side sections and drains therefor being adapted for selectively accumulating vapor condensate in any one of the vapor side sections up to said level for thereby washing the vapor side section while wash liquor is passed through the liquor side section enclosed thereby; a vapor condensate collection vessel; condensate transfer conduits interconnecting said condensate drains and said collection vessel for collecting vapor condensate in the latter; and wash supply conduits interconnecting said collection vessel and said liquor supply conduits for supplying vapor condensate from the vessel to said liquor sides for washing the latter.

References Cited

UNITED STATES PATENTS

| | | | |
|---|---|---|---|
| 1,028,738 | 6/1912 | Kestner | 159—27 |
| 2,647,570 | 8/1953 | Lockman | 159—17 |
| 2,707,022 | 4/1955 | Hessler | 159—27 |
| 2,734,565 | 2/1956 | Lockman | 159—20 |
| 2,764,233 | 9/1956 | Skinner | 159—27 |
| 2,781,089 | 2/1957 | Mair et al. | 159—20 |
| 3,258,060 | 6/1966 | Chirico | 159—20 |

NORMAN YUDKOFF, *Primary Examiner.*

J. SOFER, *Assistant Examiner.*

U.S. Cl. X R.

134—31; 159—13, 14, 47; 203—7